United States Patent [19]

McNeill et al.

[11] Patent Number: 5,119,498
[45] Date of Patent: Jun. 2, 1992

[54] FEATURE BOARD WITH AUTOMATIC ADJUSTMENT TO ONE OF TWO BUS WIDTHS BASED ON SENSING POWER LEVEL AT ONE CONNECTION CONTACT

[75] Inventors: Andrew B. McNeill, Deerfield Beach; Thomas H. Newsom, Boca Raton; Neal A. Osborn, Delray Beach; Eddie M. Reid, Boca Raton, all of Fla.

[73] Assignee: International Business Machines Corporation, Armonk, N.Y.

[21] Appl. No.: 365,269

[22] Filed: Jun. 12, 1989

[51] Int. Cl.⁵ ............................................... G06F 3/00
[52] U.S. Cl. ............................ 395/800; 364/221.0; 364/221.1; 364/221.6; 364/239.9; 364/DIG. 1; 364/DIG. 2; 361/380; 361/399
[58] Field of Search ............... 361/325, 328, 380, 407; 364/200 MS File, 900 MS File

[56] References Cited

U.S. PATENT DOCUMENTS

| | | | |
|---|---|---|---|
| 4,126,897 | 11/1978 | Capowski et al. | 364/200 |
| 4,291,370 | 9/1981 | Charles | 364/200 |
| 4,306,298 | 12/1981 | McElroy | 364/900 |
| 4,309,754 | 1/1982 | Dinwiddie, Jr. | 364/200 |
| 4,374,410 | 2/1983 | Sakai et al. | 364/200 |
| 4,443,864 | 4/1984 | McElroy | 364/900 |
| 4,447,878 | 5/1984 | Kinnie et al. | 364/200 |
| 4,471,458 | 9/1984 | Weilbacker et al. | 364/900 |
| 4,500,933 | 2/1985 | Chan | 364/200 |
| 4,633,437 | 12/1986 | Mothersole et al. | 364/900 |
| 4,667,305 | 5/1987 | Dill et al. | 364/900 |
| 4,675,808 | 6/1987 | Grinn et al. | 364/200 |
| 4,683,534 | 7/1987 | Tietjen et al. | 364/200 |
| 4,716,527 | 12/1987 | Graciotti | 364/200 |
| 4,739,475 | 4/1988 | Mensch, Jr. | 364/200 |
| 4,751,671 | 6/1988 | Babetski et al. | 364/900 |
| 4,755,934 | 7/1988 | Inoue | 364/200 |
| 4,779,190 | 10/1988 | O'Dell et al. | 364/200 |
| 4,803,623 | 2/1989 | Klashka et al. | 364/200 |
| 4,873,458 | 10/1989 | Yoshida | 307/362 |
| 4,885,482 | 12/1989 | Sharp et al. | 364/200 |
| 4,991,085 | 2/1991 | Pleva et al. | 364/200 |
| 5,023,823 | 6/1991 | Cargin, Jr. et al. | 364/900 |

OTHER PUBLICATIONS

Article: "Format Conversion Using a FIFO Buffer", Computer Design—Jun. 1973, pp. 84–88.

Primary Examiner—Thomas C. Lee
Assistant Examiner—William M. Treat
Attorney, Agent, or Firm—George E. Grosser

[57] ABSTRACT

A plug-in feature board for a computer system has special circuitry to permit the board to customize itself to the particular slot into which it is inserted. Computers of the type intended for individual use or use in small networks typically provide insertion slots including connectors to permit feature boards to be added and connected to a bus of the computer for adding new function or capacity. As the computing power of such systems has increased there have been increases in the size of portions of the connecting bus to permit improvements in data transfer performance. In a given computer system there are often two or more bus connector configurations presented in respective slots. By so converting electrical states at selected connector positions as to provide signal information for determining bus configuration for the slot, special logic provided on the board is enabled to determine the characteristics of the slot in which the board is placed and customizes the board to respond or limit response in accordance with the requirements for that configuration. By so adapting to the slot the board achieves enhanced applicability and avoids certain system disabling malfunctions which can occur when a board is plugged into a slot for which it is not configured.

4 Claims, 9 Drawing Sheets

| B | | A |
|---|---|---|
| AUDIO GND | 01 | −CD SETUP |
| AUDIO | 02 | MADE S4 |
| GND | 03 | GND |
| 14.3 Mhz OSC | 04 | A 11 |
| GND | 05 | A 10 |
| A 23 | 06 | A 09 |
| A 22 | 07 | +5V dc |
| A 21 | 08 | A 08 |
| GND | 09 | A 07 |
| A 20 | 10 | A 06 |
| A 19 | 11 | +5V dc |
| A 18 | 12 | A 05 |
| GND | 13 | A 04 |
| A 17 | 14 | A 03 |
| A 16 | 15 | +5V dc |
| A 15 | 16 | A 02 |
| GND | 17 | A 01 |
| A 14 | 18 | A 00 |
| A 13 | 19 | +12V dc |
| A 12 | 20 | −ADL |
| GND | 21 | −PREEMPT |
| −IRQ 09 | 22 | −BURST |
| −IRQ 03 | 23 | +12V dc |
| −IRQ 04 | 24 | ARB 00 |
| GND | 25 | ARB 01 |
| −IRQ 05 | 26 | ARB 02 |
| −IRQ 06 | 27 | +12V dc |
| −IRQ 07 | 28 | ARB 03 |
| GND | 29 | ARB/−GNT |
| RESERVED | 30 | −TC |
| RESERVED | 31 | +5V dc |
| −CHCK | 32 | −S0 |
| GND | 33 | −S1 |
| −CMD | 34 | M/−IO |
| CHRDYRTN | 35 | +12V dc |
| −CD SFDBK | 36 | CD CHRDY |
| GND | 37 | D 00 |
| D 01 | 38 | D 02 |
| D 03 | 39 | +5V dc |
| D 04 | 40 | D 05 |
| GND | 41 | D 06 |
| CHRESET | 42 | D 07 |
| RESERVED | 43 | GND |
| RESERVED | 44 | −DS 16 RTN |
| GND | 45 | −REFRESH |
| KEY | 46 | KEY |

*Fig. 6A*

| B | | A |
|---|---|---|
| RESERVED | 59 | RESERVED |
| RESERVED | 60 | RESERVED |
| RESERVED | 61 | GND |
| RESERVED | 62 | RESERVED |
| GND | 63 | RESERVED |
| D 16 | 64 | RESERVED |
| D 17 | 65 | +12 PWR |
| D 18 | 66 | D 19 |
| GND | 67 | D 20 |
| D 22 | 68 | D 21 |
| D 23 | 69 | +5 PWR |
| RESERVED | 70 | D 24 |
| GND | 71 | D 25 |
| D 27 | 72 | D 26 |
| D 28 | 73 | +5 PWR |
| D 29 | 74 | D 30 |
| GND | 75 | D 31 |
| −BE 0 | 76 | RESERVED |
| −BE 1 | 77 | +12 PWR |
| −BE 2 | 78 | −BE 3 |
| GND | 79 | −DS 32 RTN |
| TR 32 | 80 | −CD DS 32 |
| A 24 | 81 | +12 PWR |
| A 25 | 82 | A 26 |
| GND | 83 | A 27 |
| A 29 | 84 | A 28 |
| A 30 | 85 | +5 PWR |
| A 31 | 86 | RESERVED |
| GND | 87 | RESERVED |
| RESERVED | 88 | RESERVED |
| RESERVED | 89 | GND |

*FIG. 6B*

FEATURE BOARD WITH AUTOMATIC ADJUSTMENT TO ONE OF TWO BUS WIDTHS BASED ON SENSING POWER LEVEL AT ONE CONNECTION CONTACT

BACKGROUND OF THE INVENTION

1. Field of the Invention

This invention relates to computers and more particularly to feature boards for insertion into a slot of a computer to provide increased or enhanced function.

2. Description of the Related Art

It is well known to provide a computer, such as a PS/2 brand computer from International Business Machines Corp. with slots including one or more bus connectors to permit feature boards with associated circuitry to be connected to the computer bus to permit the user to expand the computer's capabilities. These slots provide physical support for the feature boards and the bus connector(s) is arranged to mate with a connector on the feature board when the board is fully inserted into the slot.

In certain computers, such as the IBM PS/2 Model 80, two different size bus connectors are provided in respective slots. These different connectors reflect differences in the number of parallel bits allocated to data and memory addressing. Usually the bits are allocated in multiples of eight and in the case of the Model 80 there are slots which provide for 16 parallel bits of data and addressing as well as slots which provide for 32 parallel bits. It is also known to provide a flag bit position to indicate when a command sent over the bus is a 16 or a 32 bit command (e.g. logic 1=32 bit and logic 0=16 bit) so that a board in a 16 bit slot may detect commands that are outside its range and take no action. This permits a 16 bit board to avoid a situation where, seeing only a portion of a command or address, it proceeds with an improper action.

This flag bit position does not however provide any protection in the event a 32-bit board is inserted in a 16-bit slot. In that case the board will proceed as if it is in a 32-bit slot and interpret binary signals at the missing positions on the bus connector improperly.

It is also known to steer data between two data busses of different size but such steering is typically effected by fixed interface logic recognizing that the bus definition on either side will remain the same.

BRIEF SUMMARY OF THE INVENTION

One object of the present invention is to provide a feature board for a computer which customizes itself to its slot position.

Another object of the invention is to provide such a feature board which will detect when it is in a slot which provides for a board of lesser bus width.

A further object of the invention is to provide such a feature board which recognizes when it is situated in a slot for a lesser bus width and performs those commands that are appropriate to such a slot.

In accordance with the present invention, a feature board is provided including special circuitry for detecting a condition which ordinarily does not provide status information and then so responding to that condition that a binary signal is provided indicative of the bus width of the slot. In a presently preferred implementation, a direct current power main provides the basis for generating a logic signal indicating bus width and the board so limits its responses to commands as to prevent addressing memory locations outside the addressing range for the bus configuration of the slot in which it is inserted.

The features of the invention believed to be novel are specifically set forth in the appended claims. However, the invention itself, both as to its structure and method of operation, may best be understood by referring to the following description in conjunction with the accompanying drawings.

BRIEF DESCRIPTION OF THE DRAWINGS

FIGS. 6A and 6B are a diagrammatic representation of the system connector pin assignments for a 16-bit bus width according to the Micro Channel brand architecture employed on IBM PS/2 computers.

DETAILED DESCRIPTION

Figure 1:
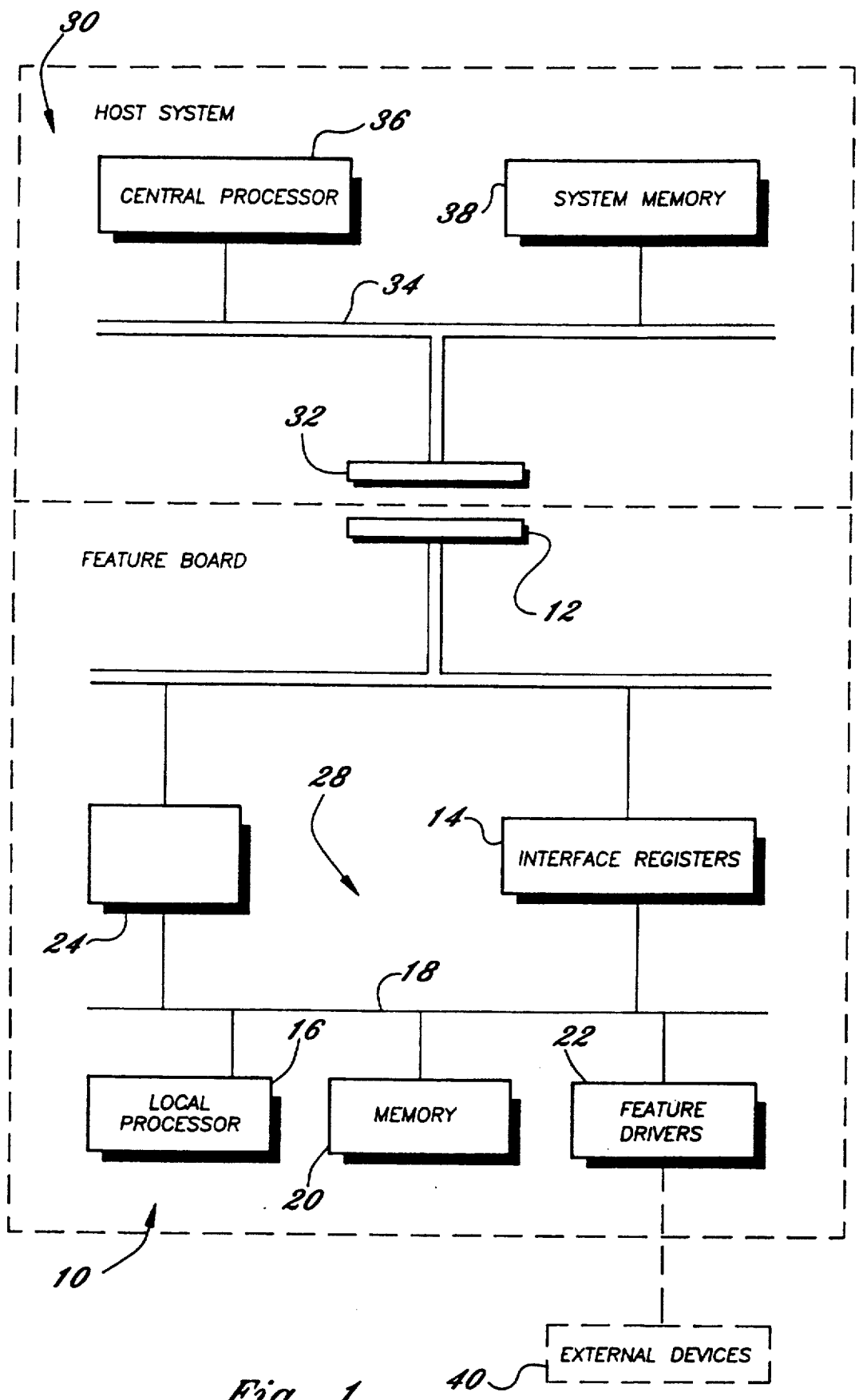
FIG. 1 is a diagrammatic representation in block form indicating elements of a host system connected to presently preferred implementation for a feature board wherein logic to test commands may be implemented by a programmable local processor.

Referring to FIG. 1 a feature board 10 is shown coupled to a host system 30 by a board connector 12 which mates with a system connector 32 to receive signals and power from a system bus 34. The host system 30 includes a central processor 36 and system memory 38 connected to the system bus 34 as is typical for such systems as the IBM Personal System/2 brand computers.

From the board connector 12 signals are received at interface registers 14 which are accessed by a local processor 16 over a local bus 18. A system memory 20 and feature drivers 22 are also connected to the local bus 18 and may be considered along with the local processor 16 and system memory 20 a part of the overall feature circuitry 28. Feature drivers 22 would vary from board to board and might, for example, control external devices 40 such as disk drives conforming to the Small Computer System Interface. A converter circuit 24 is connected to the board connector 12, according to the preferred implementation for the invention, and provides a signal to the local bus 18.

Figure 2:
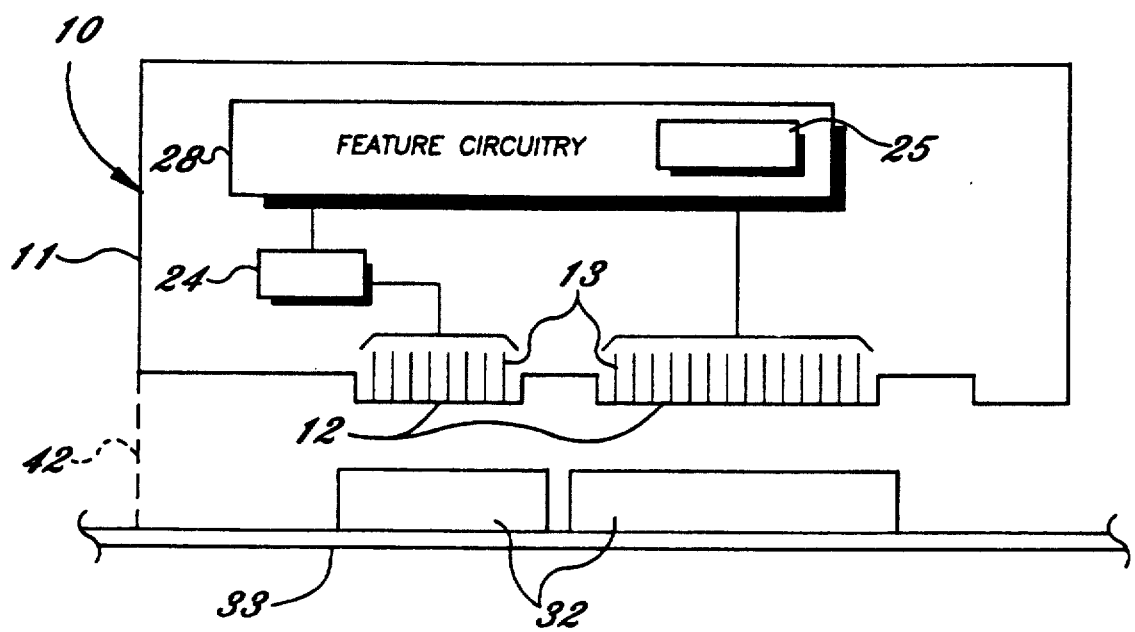
FIG. 2 is a diagrammatic representation of a feature board according to the invention about to be inserted in a slot having a connector with the full contact set for which the board is designed.
Figure 3:
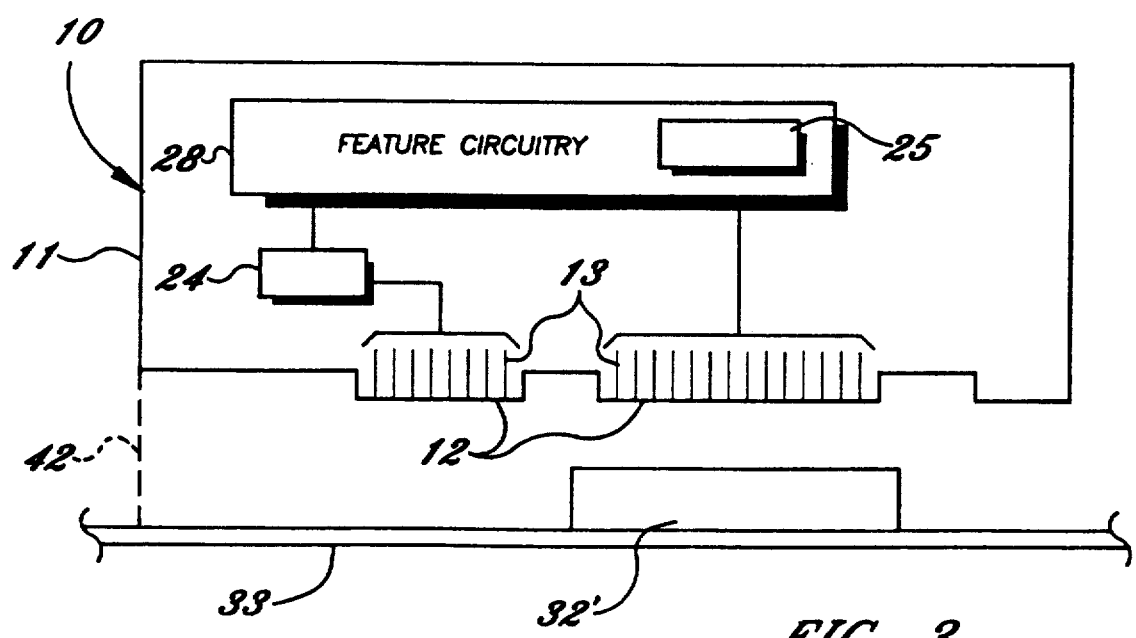
FIG. 3 is a diagrammatic representation of a feature board according to the invention about to be inserted in a slot in which a portion of the connector contacts do not engage contacts of a system connector.

Considering FIG. 2, the feature board 10 is shown including a panel 11 rigid circuit board material. Individual contacts 13 of board connector 12 are situated in preselected spaced positions on either side of the panel 11 (less than the preferred number of contacts have been shown for clarity of illustration). The system connector 32 is mounted to a planar board 33 and is configured with contacts (not shown) for engaging the contacts 13 over the length of board connector 12 and serves to define receiving slot 42. The board connector as indicated is preferrably a male board edge connector and the system connector would then be a female board edge connector. In contrast, to FIG. 2, FIG. 3 shows an abbreviated system connector 32′, a circumstance which gives rise to the problem addressed by the invention.

Figures 4, 5:
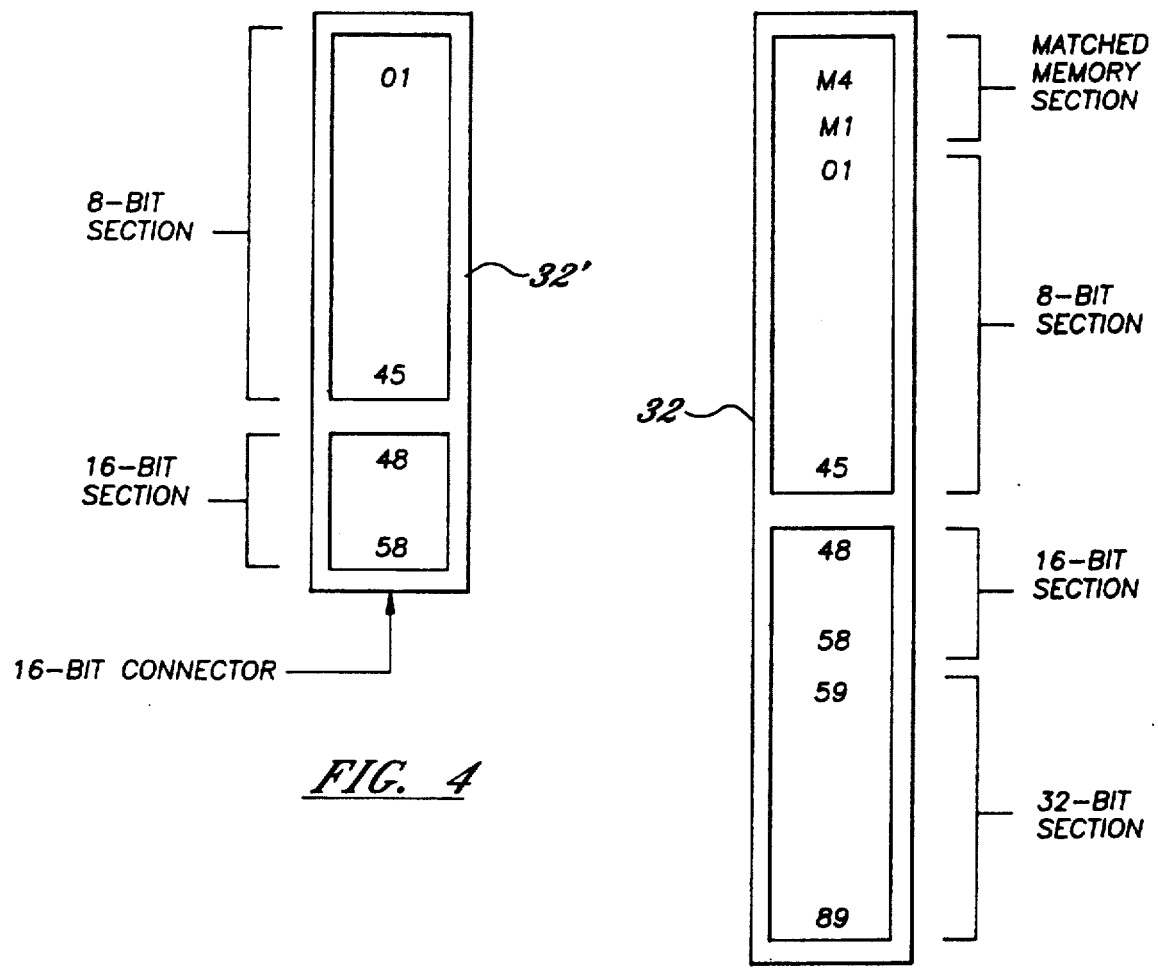
FIGS. 4 and 5 are simplified diagrammatic representations of 16 and 32 bit connectors respectively.

Referring to FIGS. 4 and 5, contact positions are indicated for typical connectors 32′ and 32 supporting 16-bit and 32-bit operation respectively. FIGS. 6A and 6B indicate the assignments for the contacts 12 assuming a system bus 34 (see FIG. 1) conforming to the Micro Channel bus specification with the A and D designations indicating address and data positions respectively. Additional description regarding such a system may be found in the "Personal System/2 Hardware Interface Technical Reference" manual.

Figure 7:
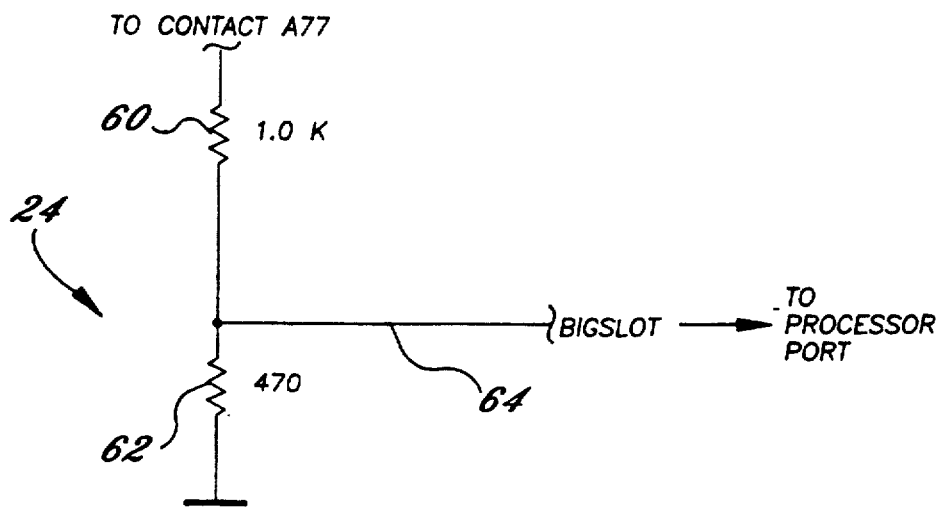
FIG. 7 is a diagrammatic representation of a preferred implementation for a converter circuit according to the invention.

Now considering FIG. 7, the converter circuit 24 according to a presently preferred implementation for the invention is connected to a particular contact 12 denoted A77 in FIG. 6B which is not engaged by a 16-bit system connector 32′ (see FIG. 3) but would engage a 12 volt DC source through a 32-bit connector 32 (see FIG. 2). Resistors 60 and 62 act as a voltage divider to produce a logic signal at tap connection 64 which applies such signal as a control signal at an input port for processor 16 (see FIG. 1) through local bus 18.

Figure 8:
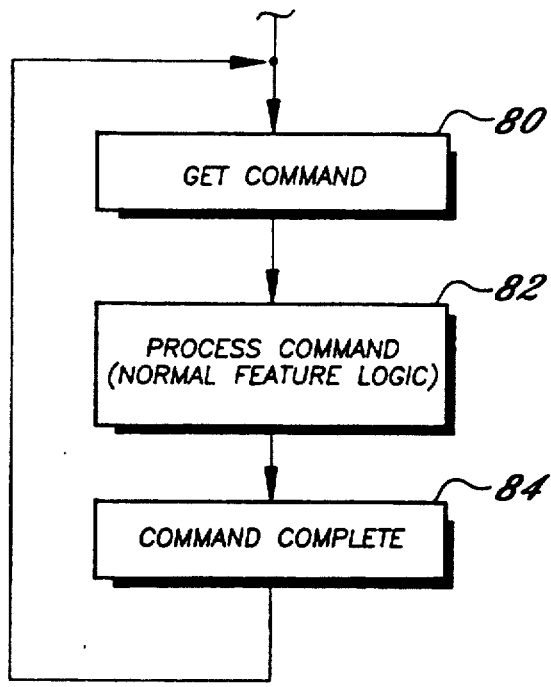
FIG. 8 is a generic flow diagram for command processing for feature circuitry of a feature board as know in the art.

A normal sequence of operations for executing a command presented by the host system 30 (see FIG. 1) is indicated in FIG. 8. This logic is preferrably implemented using a programmable processor 16 as shown in FIG. 1 which may be, for example, an Intel 8032 processor. Initially, the command is accessed by logic block 80 from registers 14. The command is then processed according to the logic 82 which would be prepared by the implementater in accordance with the function of the particular feature board 10. Then logic 84 would complete the processing cycle and prepare for the next command.

Figure 9:
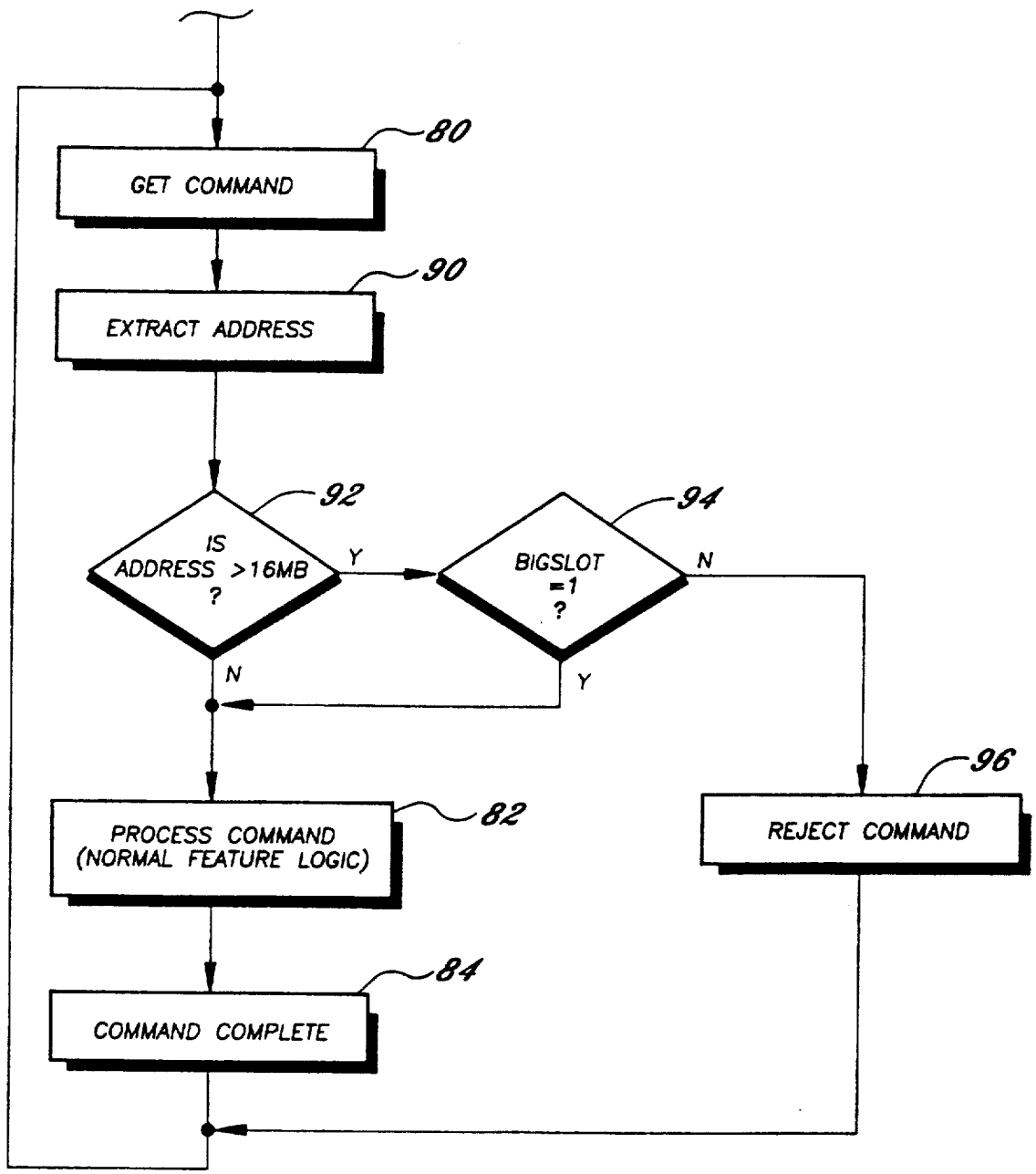
FIG. 9 is a flow diagram corresponding to FIG. 8 but further including command testing according to a preferred implementation of the invention to permit rejection of commands which cannot be executed properly.

FIG. 9 indicates the changes to the logic of FIG. 8 according to a presently preferred implementation for the invention. After the command is accessed according to logic 80 all memory addresses that the command requires to be presented on the bus 34 (see FIG. 1) are extracted and tested to determine if they exceed the 16 MB limit for 16-bit addressing. If so, logic 94 tests the BIGSLOT signal presented by convertor circuit 24 to determine whether the address exceeds the address limits of the slot. Hence, only if an address exceeds the slot limit, according to a presently preferred implementation does the card reject the command using the logic 96.

Figure 10:
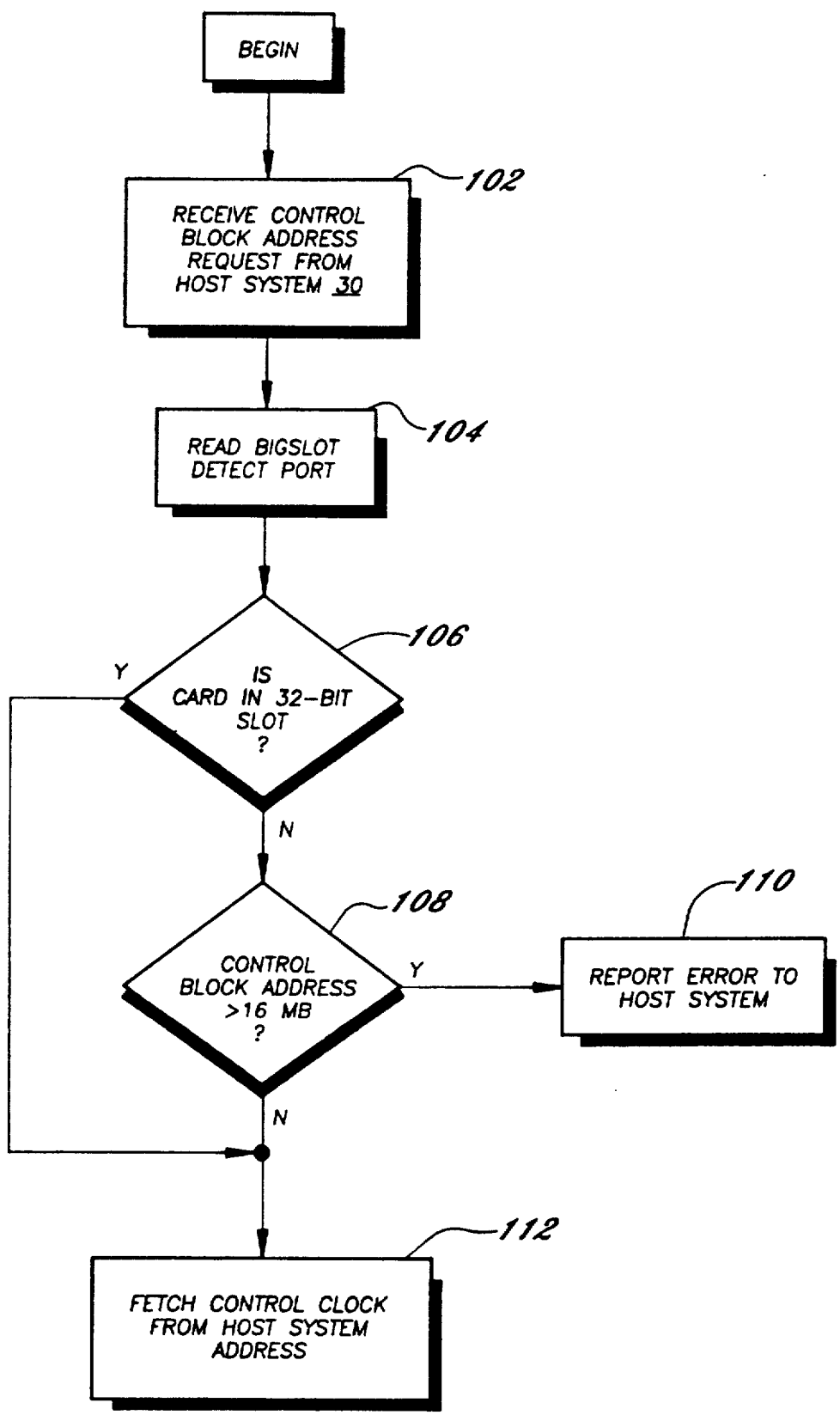
FIG. 10 is a detailed flow diagram indicating logic for implementation by a general purpose processor to test for certain types of unexecutable commands received from the host system.

Referring to FIG. 10, the logic for processing commands in control block form begins with the receipt of an address for accessing the control block. The value of the BIGSLOT signal is accessed at logic 104 and at logic 106 is tested. If the slot limits addressing, the control block address tested at logic 108 and if it exceeds the slot time the host system 30 is sent an error message by logic 110. Otherwise, logic 112 fetches the control block.

Figure 11:
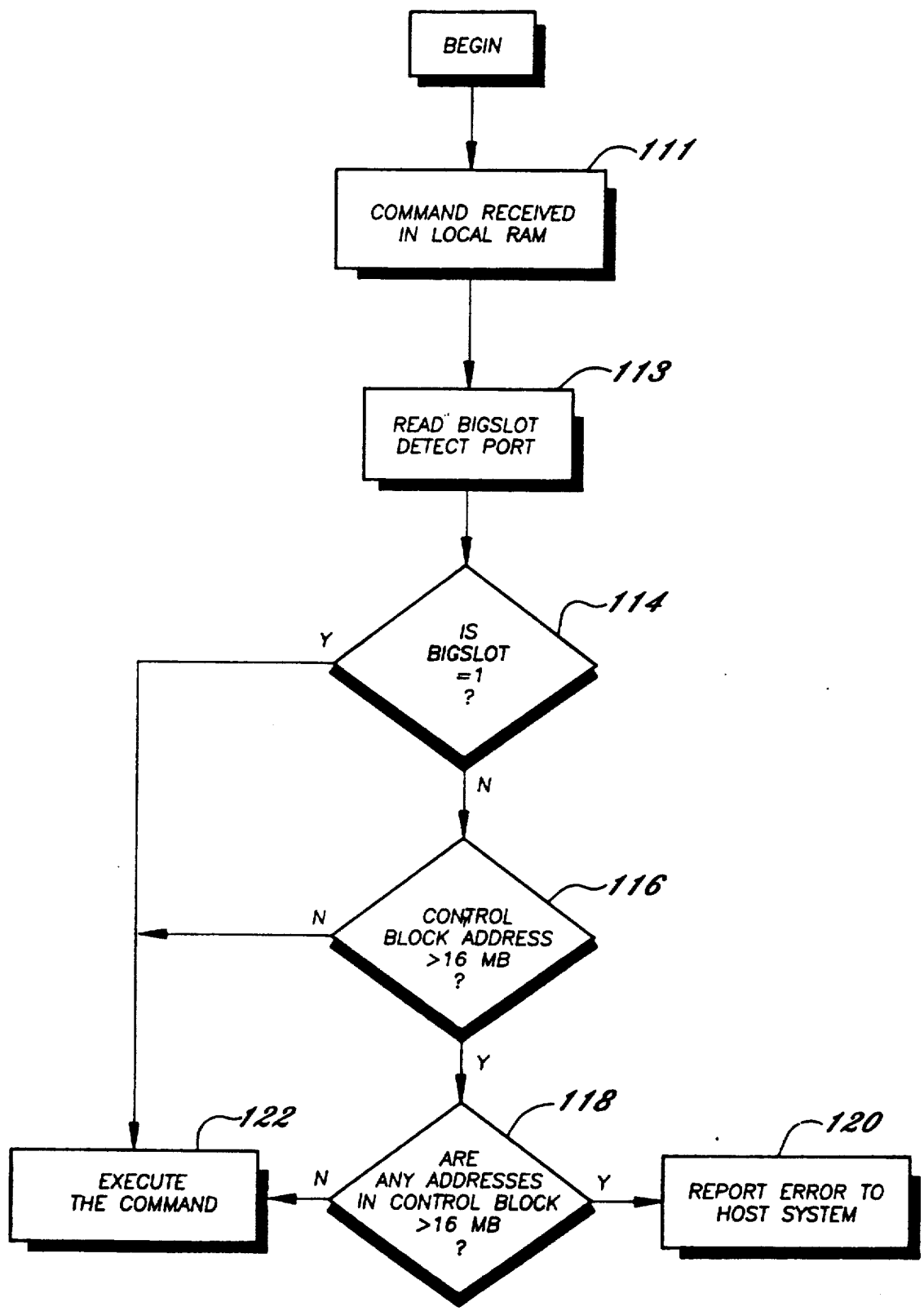
FIG. 11 is a detailed flow diagram for further logic to identify unexecutable commands received from the host processor.

Referring to FIG. 11, additional logic to compliment the logic of FIG. 10 is required for control blocks. At logic 111 the command is received at memory 20. The signal BIGSSLOT is read at logic 113 and if it indicates a limited logic slot 114 for addressing the command is tested at logic 116 to determine if it is a command of a type having one or more memory access operations. If so, the addresses are checked at logic 118 to determine if they exceed the slot limit. If any addresses exceed the slot limit an error message is send to the host system 30, by logic 120 otherwise the command is executed by logic 122.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. For use in a computer system of the type having a system bus transmitting coded signals and power signals and having plural slots for receiving pluggable feature boards, said system having a system connector at each slot, there being at least first and second different contact configurations for said system connectors, the first having a first predefined first arrangement of connected coded and power signals from said system bus and the second having said first pattern plus additional contacts including at least one connected as a power signal contact, a feature board comprising:
    a support panel receivable in said slots and having feature circuitry connected for receiving signals from said computer system;
    a board connector mounted to said panel along one edge thereof and including contacts adapted to engage the contacts of the system connector for said first and second contact configuration
    a converter circuit connected to a selected contact of said board connector which is positioned to engage said additional power signal contact of said system connector for said second contact configuration and to be unconnected for said first contact configuration, which circuit senses an electrical characteristic for such selected contact and creates a slot size signal respective thereof;
    logic connected to receive said slot size signal which modifies the operation of said feature circuitry respective of said slot size signal.

2. A feature board according to claim 1 for use in a system having a second contact configuration with the additional power contact of a said system connector being connected to a fixed voltage and wherein said converter circuit is a voltage divider connected to the selected contact of said board connector.

3. A feature board according to claims 1 and 2 wherein said logic tests commands received from said system bus for operations which are not executable with said first configuration and returns an error message to said computer system when such a command occurs and said first configuration is indicated by said slot size signal.

4. A feature board according to claim 1 wherein said first contact configuration corresponds to one data bus width and said second contact configuration corresponds to a larger data bus width and said logic receives commands from said system bus and selectively rejects commands which require said larger data bus of said slot size signal indicates a slot with said first contact configuration.

* * * * *